G. J. THOMPSON.
MACHINE FOR MAKING SPHERICAL ARTICLES.
APPLICATION FILED AUG. 25, 1919.
1,374,966.
Patented Apr. 19, 1921.
4 SHEETS—SHEET 2.
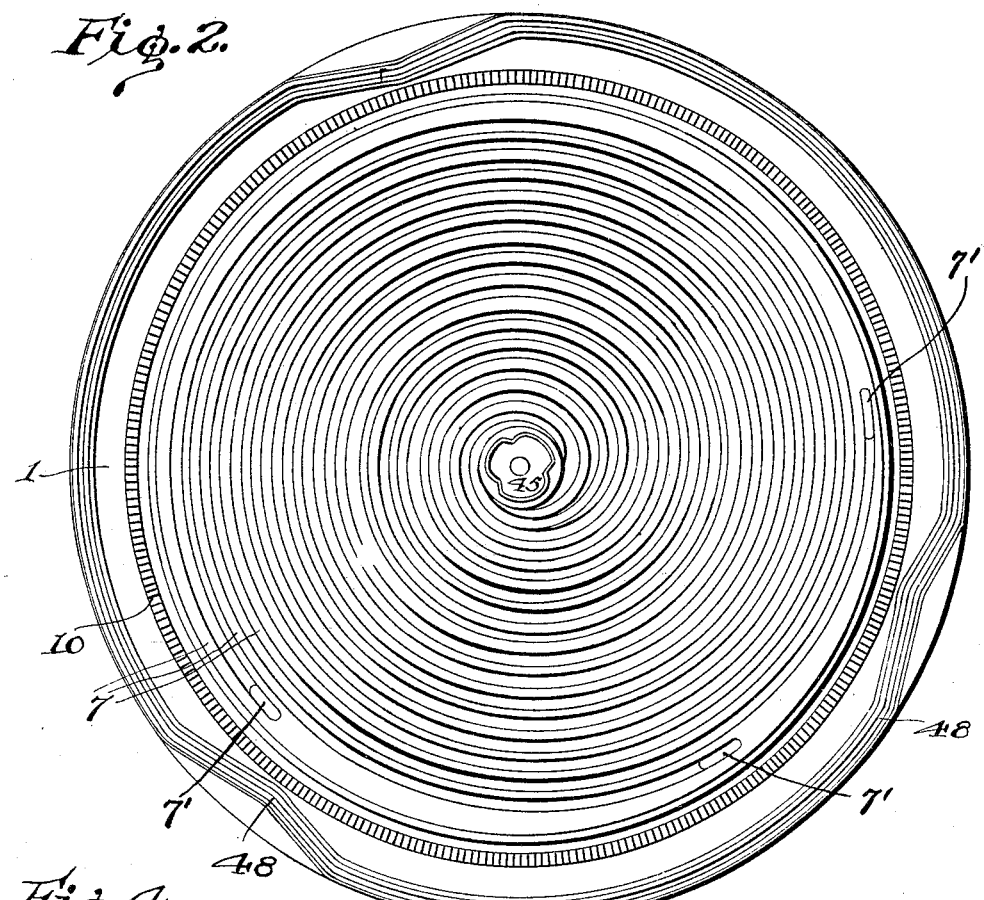
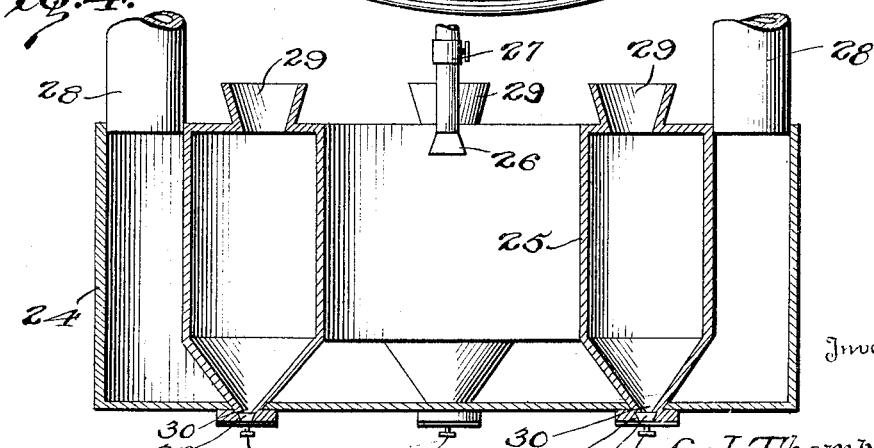
Inventor:
G. J. Thompson;
By C. C. Hines, Attorney

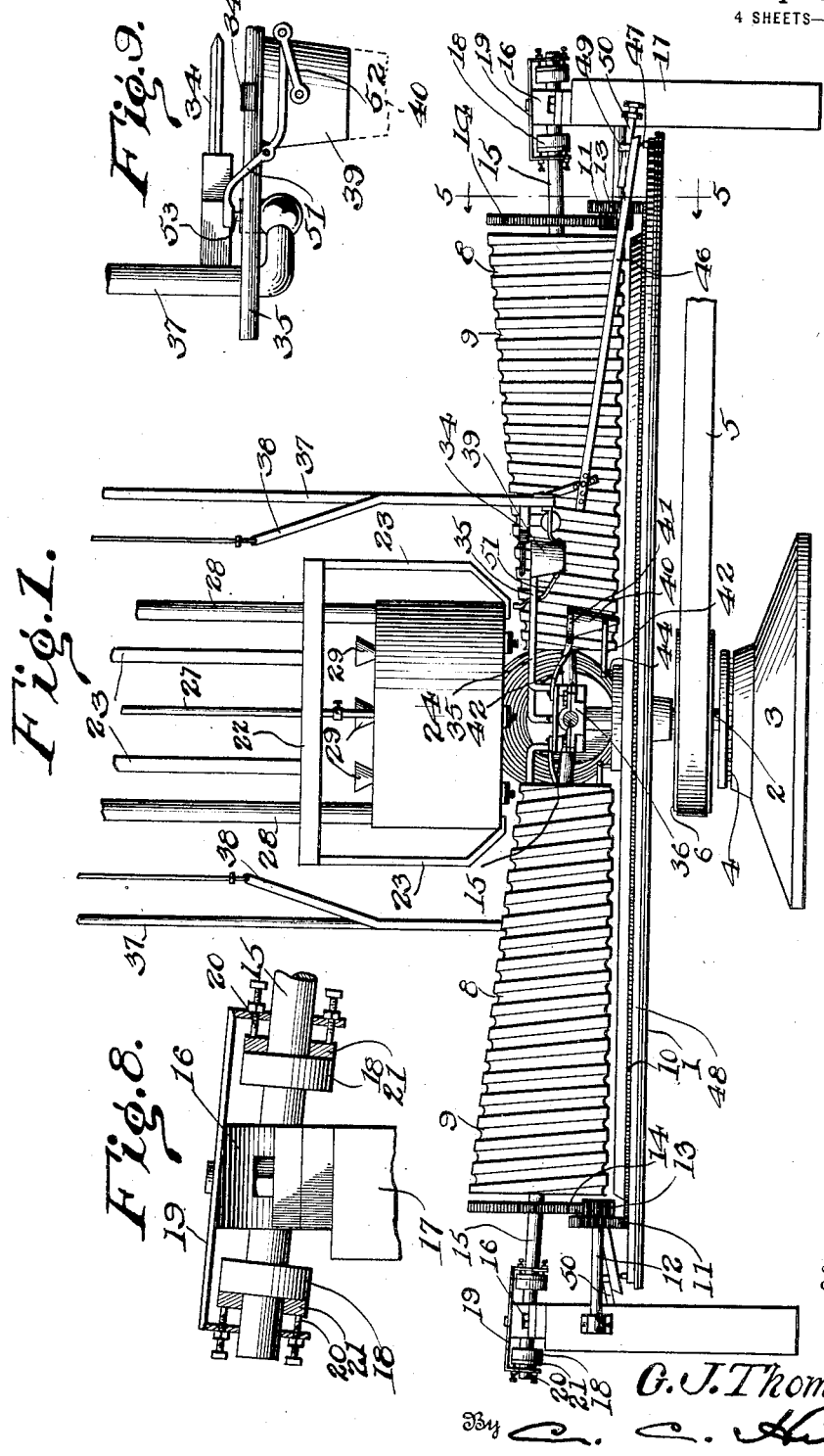

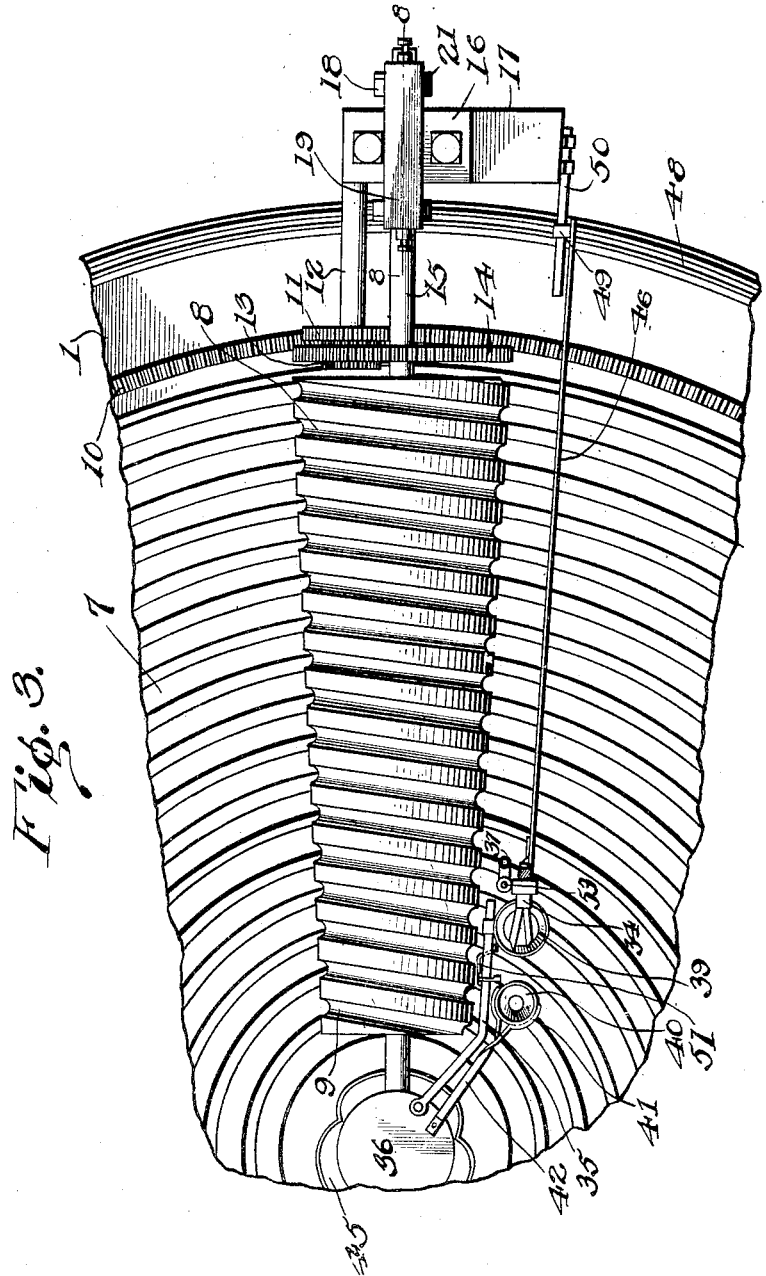

G. J. THOMPSON.
MACHINE FOR MAKING SPHERICAL ARTICLES.
APPLICATION FILED AUG. 25, 1919.

1,374,966.

Patented Apr. 19, 1921.
4 SHEETS—SHEET 4.

Inventor:
G. J. Thompson,

By

Attorney

UNITED STATES PATENT OFFICE.

GAROLD J. THOMPSON, OF CLARKSBURG, WEST VIRGINIA, ASSIGNOR TO GLAMAR MACHINE COMPANY, A CORPORATION OF WEST VIRGINIA.

MACHINE FOR MAKING SPHERICAL ARTICLES.

1,374,966.     Specification of Letters Patent.     Patented Apr. 19, 1921.

Application filed August 25, 1919. Serial No. 319,551.

*To all whom it may concern:*

Be it known that I, GAROLD J. THOMPSON, a citizen of the United States, residing at Clarksburg, in the county of Harrison and State of West Virginia, have invented new and useful Improvements in Machines for Making Spherical Articles, of which the following is a specification.

My invention relates to machines for making spherical articles such as balls, marbles, casters and the like from a molten or moldable mass of glass or other substance.

The object of the invention is to produce a machine of the class referred to which will enable such articles to be rapidly made and accurately shaped while the portions of the mass are yet in a pliable state, the articles gradually cooling during the shaping operation so that they will retain their shape upon delivery thereof from the machine.

With the above and other objects in view, the invention consists of the features of construction, combination and arrangement of parts hereinafter fully described and claimed, reference being had to the accompanying drawings, in which:—

Figure 5:
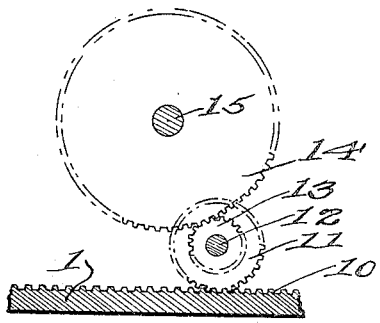
Figure 6:
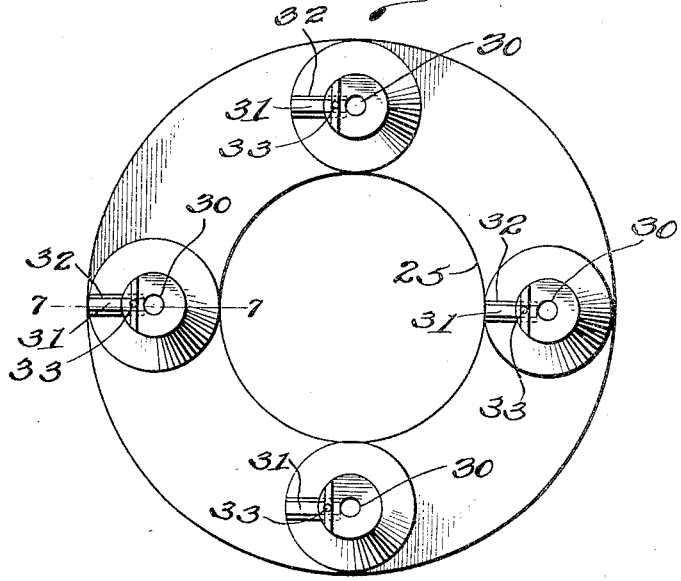
Figure 7:
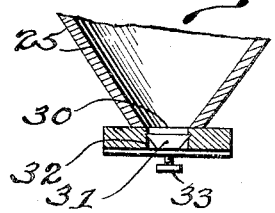

Figure 1 is a side elevation of the machine with parts omitted at the adjacent side thereof, Fig. 2 is a plan view of the turntable, omitting the superstructure, Fig. 3 is an enlarged detail plan view of a portion of the turntable, one of the rolls and the associated cutting mechanism, Fig. 4 is a vertical section of the melting pot or container, and the heating means therefor, Fig. 5 is a detail section taken substantially on line 5—5 of Fig. 1, Fig. 6 is a plan view of the container and the heating jacket, Fig. 7 is a detail section on the line 7—7 of Fig. 6, Fig. 8 is a detail section taken substantially on line 8—8 of Fig. 3, Fig. 9 is a detail view of the pneumatic cut-off device and parts associated therewith.

The machine embodies a turntable 1 rotating on a vertical spindle 2, journaled in a base 3 and supported on antifriction ball bearings 4, the turntable being driven by suitable means such as a belt 5 passing around a pulley 6 on the spindle 2 and actuated by any suitable motive power, (not shown).

The turntable 1 is formed in its upper face with a plurality of article-shaping convolute channels 7 substantially half round in cross section, starting near the center and terminating near the rim of the turntable, as shown. At its outer end, each groove communicates with a discharge outlet 7′ leading downward through the table. Above the turntable are shaping rolls 8 having spiral article-shaping channels 9 which correspond in shape with the channels 7 in cross section and always register with said channel 7, as the spherical articles are moved outwardly from the central part of the turntable toward the periphery thereof by the conjoint action of the turntable and rolls.

The rolls 8 are tapering, gradually and uniformly tapering from end to end, being largest at their outer ends and thereby providing for accelerated movement of the article being shaped, and, further, acting to gradually and evenly compress the article during its travel radially of the turntable and outward from the center thereof to the discharge openings of the same. Each roll 8 is driven at a predetermined ratio of speed with respect to the turntable by said turntable, the latter, for that purpose having near its margin a gear face 10 which drives a gear 11 on a short horizontal shaft 12 carrying also a pinion 13 meshing with a gear 14 on the arbor 15 of the respective roll 8. Each arbor 15 is longitudinally adjustable and held by means of a bearing 16 on a pedestal or support 17, collars 18 fast on the arbor at opposite sides of the bearing 16, and a yoke 19 having adjusting screws 20 which bear against loose collars or washers 21 working in contact with the collars 18. By adjustment of the screws 20 the shaping channels of the rolls 8 may be caused to register exactly with the shaping channels of the turntable.

Above the turntable and rolls is a superstructure including an overhead beam or support 22 and hangers 23 carrying a heating jacket or drum 24 inclosing a pot or container 25 for the molten mass from which the articles are made. The jacket 24 contains more heaters or burners 26 supplied by one or more fuel feed pipes 27, the products of combustion passing upward through one or more flues 28.

The container 25 has one or more filling nozzles or openings 29 in the top thereof and a plurality of outlets 30 each controlled by a gate or valve 31 shown in the form of a slide movable through a guide 32 on the bottom of the container, the degree of opening movement of said gate being governed by an adjustable stop screw 33.

The means for operating the gates 31 and severing portions of the outflowing mass comprises in conjunction with each gate and the adjacent roll 8, a pneumatic cutting-off device 34 shown in the form of shears carried by or provided with a guide member 34' slidable radially with respect to the center of the turntable on a substantially horizontal guide 35 supported by and extending from a center bearing 36 in which the inner ends of the roll arbors 16 are journaled. Compressed air is furnished to the cutting-off devices 34 through flexible tubes 37 from a compressed air supply (not shown) each device 34 being suspended by a flexibly supported arm or hanger 38. Attached to and movable with each cutting-off device 34 is the upper section 39 of a funnel or chute, the lower section 40 of which is mounted for tilting movement on a pivot 41 on a supporting arm 42 projecting from the center bearing 36. A funnel tilting member 43 is pivotally attached to each funnel section 40 and has a pin or projection 44 working in a camway 45 in the center of the turntable 1. The design of the camway 45 is such as to cause the two sections of the funnel to register just as the cutting-off operation occurs, and so as to direct the cut-off portion of the mass into the proper channel 7 of the turntable.

Each cutting-off device 34 is shifted back and forth by a pull and thrust bar 46 attached at one end to the respective hanger 38 and having at its opposite end a pin or projection 47 working in a camway 48 in the outer portion of the turntable. The outer end of the bar 46 is supported and directed by a runner 49 movable along a guide 50 extending from the adjacent pedestal or support 17. A valve trigger or worker arm 51 is pivotally mounted on the adjacent guide 35. One arm of the trigger is coupled to the funnel 39 by an adjusting link 52, while the other arm of said trigger is movable to engage a pin or projection 53 which brings about the shearing operation of the respective cutting-off device 34. The pin 53 may, for example, control or form the stem of a spring-closed air inlet and outlet valve of said cutting-off device. As the cutting-off device 34 and funnel 39 are moved inwardly or forwardly, the valve actuating arm of the trigger 51, which is normally raised above the position shown in Fig. 9, is depressed by the action of the link 52 and thereby caused to engage and depress the member 51, thus opening the valve for the supply of fluid pressure to operate the shears 34. The shears thus sever the batch of glass fed through the coöperative outlet 30, the severed portion of the glass dropping into the alined funnel or chute sections and into a forming groove of the turntable. On the backward movement of the shears and funnel section 39, the link 52 raises the valve actuating arm of the trigger 51, allowing the valve to close or to be reset for the subsequent operation. It will thus be understood that at each back and forth movement of the cutting-off device, the funnel or chute is properly set to direct a severed portion of the mass into the proper shaping channel of the turntable, and the shears are caused to operate to sever the portion of glass fed through the outlet 30. It will be understood that the completed balls or spheres discharge through the openings 7' onto the floor or into suitable receptacles.

It is to be understood that in practice, I may employ any well-known or preferred type of cutting-off device *per se*, such as those of a type in common use and patented to William J. Miller, of Coffeyville, Kansas, Patent No. 950,941, dated March 1, 1910, or any other desired construction of cutting-off mechanism. I prefer, however, to employ one in which pivotal shear blades are coupled to a cylinder and piston actuated by compressed air and wherein a suitable valve mechanism which may be controlled by a tripping device of the kind disclosed, governs the outlet and exhaust of compressed air to effect the operation of the shears. As the specific construction of the shears is, therefore, immaterial, within certain limits, to the proper disclosure of my invention, I have not deemed it necessary to illustrate any particular kind in detail, as any suitable for the purpose may be used.

While the drawings illustrate four rolls 8 and a corresponding number of cutting-off devices, gates and funnels it will be obvious that the number of such mechanisms may be increased or decreased according to the desired capacity of the machine. The completed articles are discharged by gravity through openings 7' in the turntable.

It is now preferred to lead the fuel through a central tube 27 to the heater or burner and direct the flame or heat all around and outside of the pot or container 25 as best shown in Fig. 8, to obtain the best results.

While I have shown and described a practical embodiment of my invention, it will be understood that the machine is susceptible of many changes in the form, proportion and minor details of construction which may accordingly be resorted to without departing from the spirit or sacrificing any of the advantages of the invention herein set forth.

Having thus fully described my invention, I claim:—

1. In a machine for making spherical articles from a molten mass, the combination of a turntable having a plurality of convolute shaping channels in its upper face, a roll mounted above said table to rotate on a substantially horizontal axis and having spiral shaping channels registering with the channels in the turntable, means for imparting motion to said turntable and roll, a molten mass container superposed above said table, and feeding means for delivering portions of said mass intermittently to the shaping channels of the turntable.

2. In a machine for making spherical articles from a molten mass, the combination of a turntable having a plurality of convolute shaping channels in its upper face, rolls mounted above said table to rotate each on a substantially horizontal axis and having spiral shaping channels registering with the channels in the turntable, means for imparting motion to said turntable and rolls, a molten mass container superposed above said table, and feeding means for delivering portions of said mass intermittently to the shaping channels of the turntable, the turntable and rolls being geared together for synchronous movement to maintain the shaping channels thereof in registry.

3. In a machine for making spherical articles from a molten mass, the combination of a turntable having a plurality of convolute shaping channels in its upper face, rolls mounted above said table to rotate each on a substantially horizontal axis and having spiral shaping channels registering with the channels in the turntable, means for imparting motion to said turntable and rolls, a molten mass container superposed above said table, and feeding means for delivering portions of said mass intermittently to the shaping channels of the turntable, said rolls being geared to the turntable by positive means to cause said roll to make a plurality of revolutions for each revolution of the turntable.

4. In a machine for making spherical articles from a molten mass, the combination of a turntable having a plurality of convolute shaping channels in its upper face, a plurality of rolls mounted above said table to rotate each on a substantially horizontal axis and having a spiral shaping channel registering with the channels in the turntable, means for imparting motion to said turntable and rolls, a molten mass container superposed above said table, and feeding means for delivering portions of said mass intermittently to the shaping channels of the turntable, said means including a cutting-off device for periodically severing such portions from the molten mass.

5. In a machine for making spherical articles from a molten mass, the combination of a turntable having a plurality of convolute shaping channels in its upper face, a plurality of rolls mounted above said table to rotate each on a substantially horizontal axis and having a spiral shaping channel registering with the channels in the turntable, means for imparting motion to said turntable and rolls, a molten mass container superposed above said table, feeding means for delivering portions of said mass intermittently to the shaping channels of the turntable, said means including a cutting-off device for periodically severing such portions from the molten mass, and means controlled by the turntable for operating said cutting-off device.

6. In a machine for making spherical articles from a molten mass, the combination of a turntable having a plurality of convolute shaping channels in its upper face, a plurality of rolls mounted above said table to rotate each on a substantially horizontal axis and having a spiral shaping channel registering with the channels in the turntable, means for imparting motion to said turntable and rolls, a molten mass container superposed above said table, and feeding means for delivering portions of said mass intermittently to the shaping channels of the turntable, said means including a funnel which receives the severed portions of the mass and conducts them to the shaping channels of the turntable.

7. In a machine for making spherical articles from a molten mass, the combination of a turntable having a plurality of convolute shaping channels in its upper face, a plurality of rolls mounted above said table to rotate each on a substantially horizontal axis and having a spiral shaping channel registering with the channels in the turntable, means for imparting motion to said turntable and rolls, a molten mass container superposed above said table, a heater for said container, supporting means for said container and heater independent of the turntable, and feeding means for delivering portions of said mass intermittently to the shaping channels of the turntable.

8. In a machine for making spherical articles from a molten mass, the combination of a turntable having a convolute shaping channel in its upper face, a roll mounted above said table to rotate on a substantially horizontal axis and having a spiral shaping channel registering with the channel in the turntable, means for imparting motion to said turntable and roll, and a molten mass container superposed above said table, said roll uniformly increasing in diameter from its receiving toward its delivery end.

9. In a machine for making spherical articles from a molten mass, the combination of a turntable having a plurality of convolute shaping channels in its upper face, a plurality of rolls mounted above said table to rotate each on a substantially horizontal axis and having a spiral shaping channel registering with the channels in the turntable, means for imparting motion to said turntable and rolls, a molten mass container superposed above said table, and feeding means for delivering portions of said mass intermittently to the shaping channels of the turntable, the turntable having an outlet opening at the terminal of each of said channels therein for the delivery of the completed articles therefrom.

10. In a machine for making spherical articles from a molten mass, the combination of a turntable having a plurality of convolute shaping channels in its upper face, a plurality of rolls mounted above said table to rotate each on a substantially horizontal axis and having spiral shaping channels registering with the channels in the turntable, means for imparting motion to said turntable and rolls, a molten mass container superposed above said table feeding means for delivering portions of said mass intermittently to the shaping channels of the turntable, said means including a gate controlling an outlet from the container, and an intermittently operated cutting-off device for said mass.

11. In a machine for making spherical articles from a molten mass, the combination of a turntable having a plurality of convolute shaping channels in its upper face and each having a discharge opening at one of the terminals thereof, rolls mounted above said table to rotate on a substantially horizontal axis and each having a spiral shaping channel registering with the channels in said turntable, means for imparting motion to said turntable and rolls, and a molten mass container superposed above said turntable and having discharge outlets for delivering portions of the mass to the shaping channels of said turntable.

12. In a machine for making spherical articles from a molten mass, the combination of a turntable having a plurality of convolute shaping channels in its upper face and each having a discharge opening at one of the terminals thereof, tapering rolls mounted above said table to rotate on a substantially horizontal axis and each having a spiral shaping channel registering with the channels in said turntable, means for imparting motion to said turntable and rolls, and a molten mass container superposed above said turntable and having discharge outlets for delivering portions of the mass to the shaping channels of said turntable.

13. In a machine for making spherical articles from a molten mass, the combination of a turntable having a plurality of convolute shaping channels in its upper face and each having a discharge opening at one of the terminals thereof, inwardly tapering rolls mounted above said table to rotate on a substantially horizontal axis and each having a spiral shaping channel registering with the channels in said turntable, means for imparting motion to said turntable and rolls, and a molten mass container superposed above said turntable and having discharge outlets for delivering portions of the mass to the shaping channels of said turntable.

14. In a machine for making spherical articles from a molten mass, the combination of a turntable having a plurality of convolute shaping channels in its upper face and each having a discharge opening at the outer terminals thereof, inwardly tapering rolls mounted above said table to rotate on a substantially horizontal axis and each having a spiral shaping channel registering with the channels in said turntable, means for imparting motion to said turntable and rolls, and a molten mass container superposed above said turntable and having discharge outlets for delivering portions of the mass adjacent the inner terminals of the shaping channels of said turntable.

15. In a machine for making spherical articles from a molten mass, the combination of a turntable having a plurality of convolute shaping channels in its upper face and each having a discharge at the outer terminals thereof, inwardly tapering rolls mounted above said turntable to rotate on a substantially horizontal axis and each having a spiral shaping channel registering with the channels in said turntable, means for imparting motion to said turntable and rolls, a molten mass container superposed above said turntable and having discharge outlets therein, and means for delivering portions of the mass intermittently from the discharge outlets at points adjacent the inner terminals of the shaping channels of said turntable.

16. In a machine for making spherical articles from a molten mass, the combination of a turntable having a plurality of convolute shaping channels in its upper face and each having a discharge at the outer terminals thereof, inwardly tapering rolls mounted above said turntable to rotate on a substantially horizontal axis and each having a spiral shaping channel registering with the channels in said turntable, means for imparting motion to said turntable and rolls, a molten mass container superposed above said turntable and having discharge outlets therein each complemental to one of said rolls, and means for delivering portions of the mass intermittently from the discharge outlets at points adjacent the inner terminals of the shaping channels of said turntable.

17. In a machine for making spherical articles from a molten mass, the combination of a turntable having a convolute shaping channel in its upper face and having a discharge opening at its outer terminal, a roll mounted above said turntable and having a spiral shaping channel registering with the channel of the latter, means for imparting motion to said turntable and roll, a molten mass container superposed above said turntable and concentric thereto, and means for intermittently delivering portions of the mass from said container at a point adjacent the inner terminal of the shaping channel of said turntable.

18. In a machine for making spherical articles from a molten mass, the combination of a turntable having a plurality of convolute shaping channels in its upper face and each having a discharge outlet adjacent the outer terminals thereof, a plurality of rolls mounted above said table and each having a spiral shaping channel registering with the channels of the latter, means for imparting motion to said turntable and rolls, a molten mass container superposed above said turntable and concentric thereto and having discharge outlets one complemental to each of said rolls, and means for intermittently delivering portions of the mass at points adjacent the inner terminals of the shaping channels of said turntable.

19. In a machine of the class described, the combination with a turntable having shaping channels in its upper face, tapering rollers equidistantly spaced above the turntable and extending radially thereof, power means operating said turntable and said rolls simultaneously, and a feeding mechanism therefor, said feeding mechanism comprising a molten mass container superposed concentrically with and above said turntable and having discharge outlets one complemental to each of said rolls, means for intermittently delivering portions of the mass at points adjacent the inner terminals of the shaping channels of said turntable, and heating means for maintaining the mass in molten state throughout the operation of said machine.

20. A feeding mechanism for machines for making spherical articles comprising a casing, a plurality of hoppers equidistantly spaced within said casing and from the walls thereof, means for delivering material to each of said hoppers, means for introducing a heating medium to said casing, and means for discharging the material in molten state from each of said hoppers.

21. A feeding mechanism for machines for making spherical articles comprising a circular casing, a plurality of cylindrical hoppers spaced within said casing and from the wall thereof, means for delivering material to each of said hoppers, means for introducing a heating medium to said casing, and means for discharging the material in molten state from each of said hoppers.

22. A feeding mechanism for machines for making spherical articles comprising an inclosed circular casing, a plurality of cylindrical hoppers equidistantly spaced within said casing and from the walls thereof, means for introducing material to each of said hoppers, means for introducing a heating medium to said casing for the heating of the material in said hoppers, and means for intermittently discharging the material in molten state from said hoppers.

23. A machine for making spherical articles comprising a turntable, shaping channels formed in the upper face of said turntable and extending radially thereof on curved parallel lines and having discharge outlets opening therethrough adjacent the periphery of the same, tapering rolls equidistantly spaced above the turntable and extending radially at opposite sides of the axis thereof, and means for operating said turntable and rolls simultaneously.

24. A machine for making spherical articles comprising a turntable, shaping channels formed in the upper face of said turntable and extending radially thereof on curved parallel lines and having discharge outlets opening therethrough at their outer terminals, a plurality of tapering rolls equidistantly spaced above said turntable and extending radially thereof at opposite sides of the axis of the same, each of said rolls having a spiral shaping channel registering with the channels of said turntable, and power means for rotating said turntable and rolls simultaneously.

In testimony whereof I affix my signature.

GAROLD J. THOMPSON.